(12) United States Patent
Gomez et al.

(10) Patent No.: US 11,642,993 B2
(45) Date of Patent: May 9, 2023

(54) SEAT MOUNTING STRUCTURE FOR A SEAT OF A VEHICLE AND VEHICLE AND CENTER SEAT STRUCTURE

(71) Applicant: Adient Engineering and IP GmbH, Burscheid (DE)

(72) Inventors: John J. Gomez, Howell, MI (US); James D. Biebel, Milford, MI (US); Raza Bashir, Sterling Heights, MI (US); Joseph Gasko, Commerce Charter Township, MI (US); Dalibor Dimovski, Macomb, MI (US); Kurt A. Seibold, Farmington Hills, MI (US); Xin Wei Jolene Ng, Plymouth, MI (US); John Bleau, Plymouth, MI (US); Raymond Anthony Iavasile, Beverly Hills, MI (US)

(73) Assignee: Adient US LLC, Plymouth, MI (US)

( * ) Notice: Subject to any disclaimer, the term of this patent is extended or adjusted under 35 U.S.C. 154(b) by 391 days.

(21) Appl. No.: 16/734,636

(22) Filed: Jan. 6, 2020

(65) Prior Publication Data
US 2020/0215934 A1 Jul. 9, 2020

Related U.S. Application Data

(60) Provisional application No. 62/788,996, filed on Jan. 7, 2019.

(51) Int. Cl.
*B60N 2/20* (2006.01)
*B60N 2/60* (2006.01)
(Continued)

(52) U.S. Cl.
CPC .......... *B60N 2/6027* (2013.01); *B60N 2/005* (2013.01); *B60N 2/012* (2013.01); *B60N 2/10* (2013.01); *B60N 2/16* (2013.01); *B60N 2/20* (2013.01); *B60N 2/5621* (2013.01); *B60N 2/753* (2018.02); *B60N 2/79* (2018.02); *B60N 3/004* (2013.01); *B60R 7/043* (2013.01); *B60R 22/20* (2013.01);
(Continued)

(58) Field of Classification Search
CPC . B60N 2/20; B60N 2/753; B60N 2/79; B60N 2/005; B60N 2/012; B60N 2/10; B60N 2/16; B60N 2/5621; B60N 2/6027; B60N 2/797; B60N 3/004; B60N 3/002; B60R 7/043; B60R 22/20; B60R 22/26
USPC ........................................................ 296/68.1
See application file for complete search history.

(56) References Cited

U.S. PATENT DOCUMENTS 5,823,627 A * 10/1998 Viano .................... B60N 2/688
297/483
6,145,881 A * 11/2000 Miller, III ............... B60R 22/20
280/808
(Continued)

*Primary Examiner* — Mark R Wendell
(74) *Attorney, Agent, or Firm* — Marshall & Melhorn, LLC

(57) ABSTRACT

A seat mounting structure for at least one seat in a vehicle having a vehicle structure is provided. The seat mounting structure may have a seat rib cage configured as a universal solitary mounting bracket to which at least one seat can be affixed. The seat rib cage may have a plurality of rib cage elements connected with each other to form the seat rib cage. The seat rib cage may also have a plurality of seat mounting points for mounting the at least one seat to the seat rib cage. The seat rib cage may also have a plurality of vehicle structure mounting points for mounting the seat rib cage to the vehicle structure.

20 Claims, 13 Drawing Sheets

(51) Int. Cl.
  *B60N 2/10*   (2006.01)
  *B60N 2/005*  (2006.01)
  *B60N 3/00*   (2006.01)
  *B60N 2/75*   (2018.01)
  *B60N 2/01*   (2006.01)
  *B60N 2/16*   (2006.01)
  *B60R 7/04*   (2006.01)
  *B60R 22/20*  (2006.01)
  *B60R 22/26*  (2006.01)
  *B60N 2/56*   (2006.01)
  *G05D 1/02*   (2020.01)

(52) U.S. Cl.
  CPC .............. *B60R 22/26* (2013.01); *B60N 2/797* (2018.02); *B60N 3/002* (2013.01); *G05D 1/021* (2013.01)

(56) References Cited

U.S. PATENT DOCUMENTS

| | | | |
|---|---|---|---|
| 2012/0217078 A1* | 8/2012 | Kinsman | B60K 17/34 280/756 |
| 2012/0223500 A1* | 9/2012 | Kinsman | B60G 21/055 180/312 |
| 2013/0033070 A1* | 2/2013 | Kinsman | B60J 5/0487 296/190.03 |
| 2018/0147966 A1* | 5/2018 | Reed | B60N 2/24 |
| 2018/0194404 A1* | 7/2018 | Kotrla | B60J 5/0487 |
| 2019/0106024 A1* | 4/2019 | Wellborn | B60N 2/3013 |
| 2019/0375458 A1* | 12/2019 | Sellars | B62D 21/183 |
| 2021/0237802 A1* | 8/2021 | Chalifour | B62D 23/005 |

\* cited by examiner

FIG 7C
FIG 7D
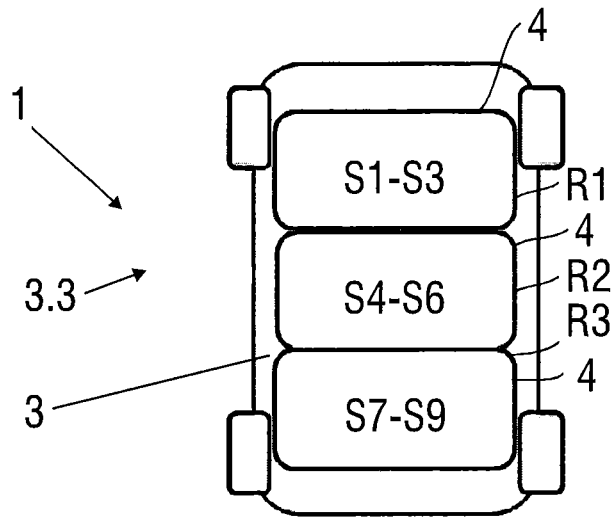
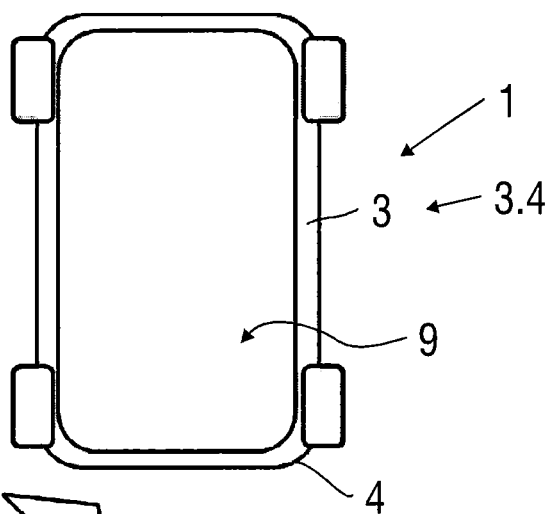
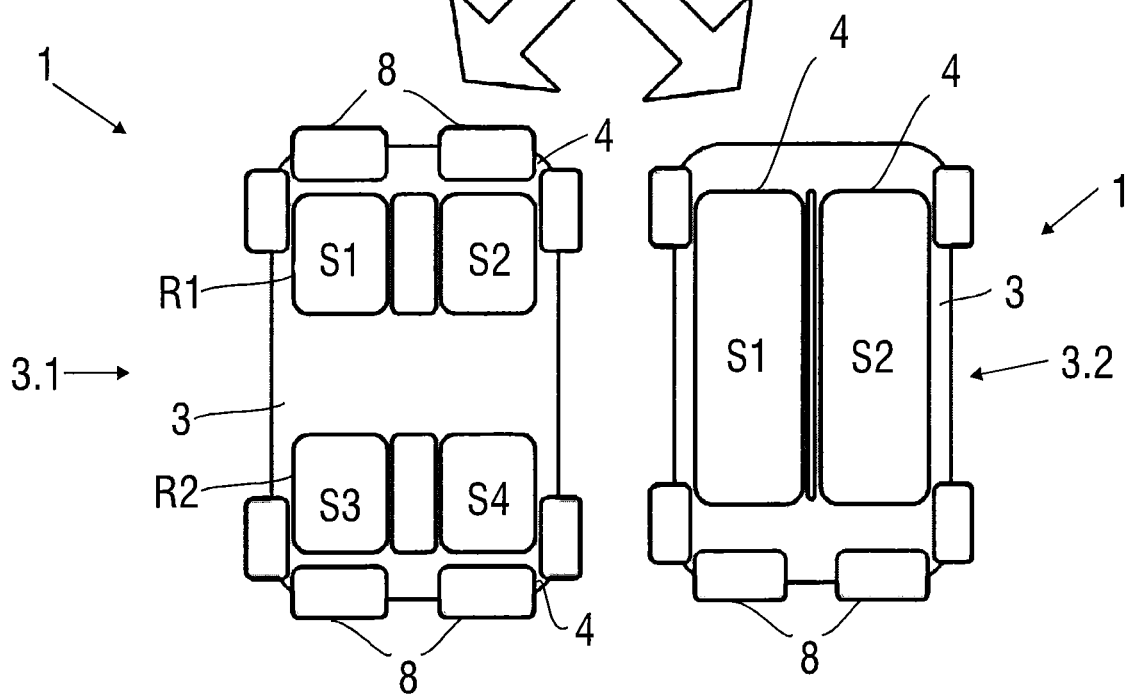
FIG 7
FIG 7A
FIG 7B

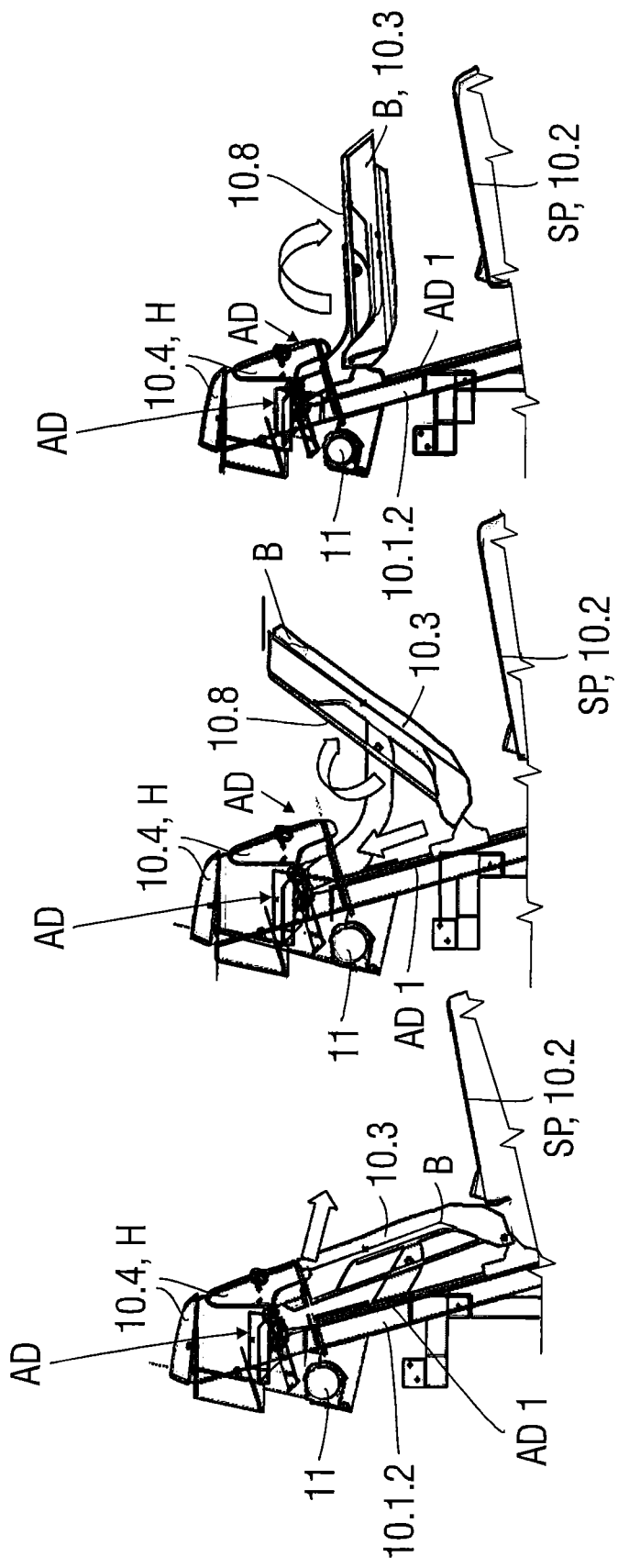

SEAT MOUNTING STRUCTURE FOR A SEAT OF A VEHICLE AND VEHICLE AND CENTER SEAT STRUCTURE

BACKGROUND OF THE DISCLOSURE

The present disclosure relates generally to a seat mounting structure for a seat of a vehicle. Further, the present disclosure relates to a vehicle and a center seat structure Automotive vehicles have a seat arrangement which may include one or more seat assemblies having a seat structure and a seat trim structure comprising a seat cushion and a seat back for supporting a passenger or occupant above a vehicle floor and a seat mounting structure for mounting the seat structure to the vehicle floor, e.g. a vehicle's frame floor structure or body frame structure. Each of the seat cushion and seat back commonly comprise a base foam pad supported by a rigid frame structure and covered by a textile trim cover of cloth, leather, and/or vinyl. The base foam pad provides firm support and durability to the seat cushion and seat back. A trim foam pad, commonly referred to as a plus pad, also is frequently disposed between the base foam pad and the trim cover to provide a softer surface for seat occupant comfort and to improve the appearance of the seat

SUMMARY OF THE DISCLOSURE

It is an object of the present disclosure to provide an improved seat mounting structure for a seat within a vehicle, in particular within an autonomous driving vehicle. It is further an object of the present disclosure to provide a vehicle having a multi-functional interior space. It is further an object of the present disclosure to provide a multi-functional center seat structure.

According to the first disclosure, a seat mounting structure is provided for mounting at least one seat, in particular for mounting three seats, within a vehicle to create a rear row or a front row. For example, the vehicle is an autonomous driving vehicle configured to autonomously pick up and transport occupants, wherein a passenger compartment, for instance, can be designed in a more comfortable and luxury way for the occupants.

The seat mounting structure comprises at least a seat rib cage which is configured as a universal solitary mounting bracket to which at least one seat can be affixed. The seat rib cage comprises at least a plurality of rib cage elements connected with each other to form the seat rib cage, a plurality of seat mounting points for detachable mounting the at least one seat to said seat rib cage, and a plurality of vehicle structure mounting points for mounting the seat rib cage to said vehicle structure, e.g. a vehicle frame structure, chassis or floor.

The seat rib cage is configured for example cantilevered and comprises integrated seat mounting points to mount at least one seat to the seat rib cage and vehicle structure mounting points for mounting the seat rib cage to the vehicle or rather to a vehicle chassis or floor. Further, the seat rib cage comprises mounting locations for seat adjusting devices, such as seat pivot and movement devices and cable and wire assembly, e.g. cable trays, cable guidance, wire trays, wire guidance.

The seat rib cage is configured as a universal mounting structure for vehicles. The seat rib cage is shaped as a bulkhead style seat mounting structure to the vehicle. This style of mounting on e.g. a vertical wall frees up space for batteries located in a vehicle floor.

In particular, the seat rib cage is arranged on the vehicle frame structure or floor and extends in a transverse direction of the vehicle floor. For example, the seat rib cage is formed in a U-shaped manner, wherein the seat or seats is/are arranged between the parallel running distanced legs of the U-shaped seat rib cage. The seat rib cage comprises a frame structure which packages the seat mounting points off the vehicle floor and to a bulkhead style beam that runs cross-car. For instance, a connection portion of the two legs forms said bulkhead style beam. The legs of the U-shaped seat rib cage form integral side impact beams for passenger safety.

In another embodiment, a front loading latch system is provided within the vehicle, in particular within the passenger compartment, for allowing service providers to quickly install and remove set of seats from an interior of the vehicle with a sliding seat fixture. The seat mounting structure is configured flexible, lightweight and easily installable and removable. Further, the seat rib cage meets structural requirements for so-called ABTS (all belts to seat) loads and provides additional passenger safety with strategically positioned cross-car, transverse running beams and longitudinal running, side beams to protect occupants.

In an exemplary embodiment the rib cage elements are configured as one of struts, beams, tubes, pipes, rods, bars, webs, rails, tracks, plates, panels or sheets. Furthermore, the seat rib cage may be configured to variably arrange at least one of a number of seat structures of at least one of seats, armrest structures, belt modules, headrest structures or auxiliary units, or seat adjusting devices.

According to a further aspect, the seat rib cage is configured to arrange and hold three seat structures of seats next to each other in such a manner that at least one outboard seat is inwardly angled with respect to a center seat. In particular, the outboard seat is inwardly angled with respect to a center seat in an angle range between 0 degrees to 20 degrees.

Additionally, the seat rib cage may be configured to retain at least one of a mounting bracket or auxiliary unit to hold a separate chair, e.g. a wheelchair, in place.

According to a further aspect, the seat rib cage is configured to retain at least one of a mounting bracket or auxiliary unit to hold at least one of a load or cargo in place.

According to a second disclosure a vehicle having a vehicle interior and a vehicle structure is provided wherein at least one of the above described seat mounting structure is arranged and affixed within the vehicle. The seat mounting structure, in particular the seat rib cage, is configured as a universal mounting rib cage to provide multiple seating and storage applications and configurations within the vehicle.

According to the third disclosure, a center seat module for a vehicle is provided wherein the center seat module comprises at least a plurality of seating modules of a seat, and a frame structure, wherein the frame structure is configured as a center mounting bracket to which the seating modules can be movably affixed to provide different functions at least one of an armrest, a tray table or a backrest and to which an auxiliary bracket is affixed to provide an additional belt fixing position.

According to an exemplary embodiment, the center seat module comprises a stationary lower frame structure and a stationary upper frame structure which is coupled to the lower frame structure. The lower frame structure comprises a reversed U-shaped form for carrying a seat pan whilst providing storage space underneath the seat pan. In particular, the storage space is provided between the two spaced apart and parallel running legs of the U-shaped lower frame structure. The seat pan is attached to the connection portion of the two legs. Further, the upper frame structure comprises an adjustment device and a movable backrest support, wherein the adjustment device is configured to adjust the backrest support into an armrest and/or table position. The movable backrest support can be transformed into a useable armrest and/or table. In particular, the adjustment device is configured to lock the backrest support in a desired vertical position as well as in a desired tilted position for improved comfort feeling. The storage space can be used for storing a beverage and/or snack bar if requested, for bags or other occupant belongings. Moreover, an integral underseat storage bin with a slide-out feature for greater access can be arranged within the storage space. In a further embodiment, the center seating module can be used as vehicle integrated booster seat for toddlers. Furthermore, such center seating module is easily serviceable, comprises a modular flexible design, is designed lightweight and provides an additional seating space, storage space or occupant comfort component when required. Further, the center seating module, such as a center seat positioned between two seats within a vehicle, comprises a so-called ABTS (all belts to seat) structure whilst providing comparatively efficient packaging. Moreover, the center seating module is configured to retain removable components and trim substrates. For example, the center seating module comprises several integral mounting clips, wherein some of them are configured to lock the center seating module to the vehicle and other ones are configured to retain seat components which can be added or exchanged.

According to the further disclosure, a belt restraint device for a vehicle seat comprises a first restraint element holding a shoulder belt, a second restraint element holding a lap belt, wherein the shoulder belt and the lap belt are brought together within the second restraint element. Further, the belt restraint device comprises an auxiliary bracket, e.g. a clip element, into which the shoulder belt is engageable for securing smaller occupants, wherein the second restraint element and the clip element are configured to be brought into different securing states dependently from each other to provide an intermediate or upper belt fixing position to secure either a smaller occupant or a bigger occupant. In particular, the second restraint element and the clip element are connected to each other in such manner that actuating one of the second restraint element or the clip element affects the other one. In a normal usage, the shoulder belt can be positioned into the clip element which extends forward when required for smaller occupants. The second restraint element, such as a lap belt router, is tied into a main structure of the seat by a latch, wherein when the latch is actuated the clip element slides forward so a user can fit the shoulder belt into the clip element. When the shoulder belt is pulled out of the clip element the second restraint element swivels around an edge of the seat to bring the shoulder belt forward. The shoulder belt can now be used for a bigger occupant. The belt restraint device is configured as an efficient ABTS (all belts to seat) system to properly position the shoulder and lap belts for both adults and smaller occupants. The said belt restraint device is a safe solution for children to be restrained properly in the seat without need of a separate child booster seat.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein:

FIG. 7 shows a top view of four replaceable embodiments of an interior of the vehicle using the seat mounting structure to provide different seat arrangements with different functions, e.g. for comfort seating, for basic economy seating, for premium seating, for cargo containment FIG. 7A shows a top view of a first embodiment of an interior of the vehicle using the seat mounting structure to provide a comfort seating, FIG. 7B shows a top view of a second embodiment of an interior of the vehicle using the seat mounting structure to provide a premium seating, FIG. 7C shows a top view of a third embodiment of an interior of the vehicle using the seat mounting structure to provide a basic economy seating, FIG. 7D shows a top view of a fourth embodiment of an interior of the vehicle using the seat mounting structure to provide cargo containment, FIG. 11B shows a side view of a center seat module with a backrest module in an upright seating position, FIG. 11C shows a side view of a center seat module with a backrest module in an intermediate, partially tilted forward position, FIG. 11D shows a side view of a center seat module with a backrest module in a tilted armrest or table position.

Corresponding parts are marked with the same reference symbols in all figures.

DETAILED DESCRIPTION OF PREFERRED EMBODIMENTS

Figure 1:
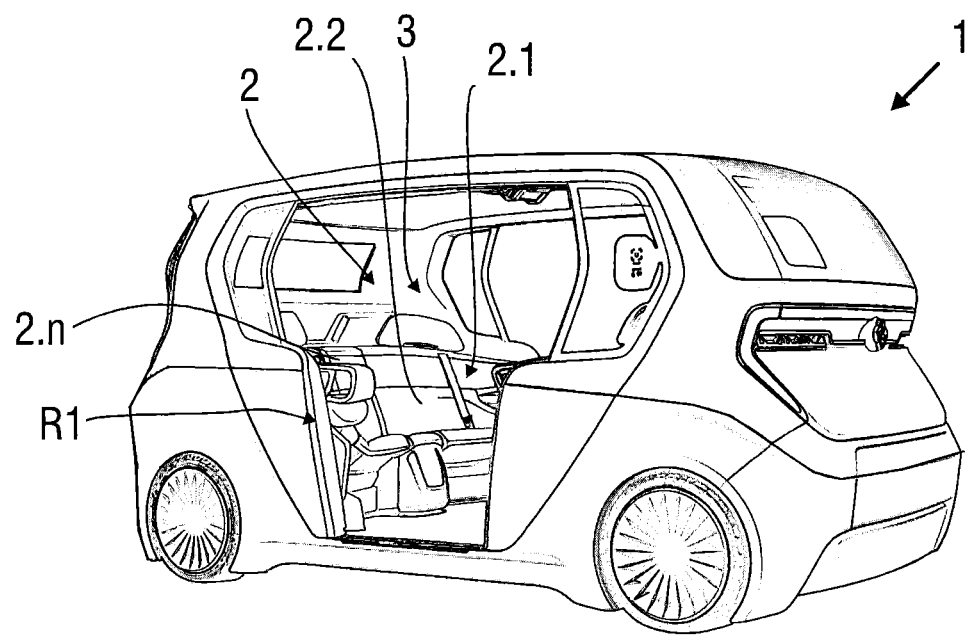
FIG. 1 shows a perspective view of a vehicle comprising a seat arrangement having a plurality of seat assemblies.

FIG. 1 shows a perspective view of an exemplary embodiment of a vehicle 1 comprising a seat arrangement 2 having a plurality of seat assemblies 2.1 to 2.*n* arranged in a row R1, e.g. a rear row. The vehicle 1 is for example an autonomous driving vehicle configured to autonomously pick up and transport occupants. A vehicle interior 3 can be designed as a passenger compartment in more economy way, comfortable way or luxury way for the occupants or as a loading or storage compartment vehicle.

Figure 2:
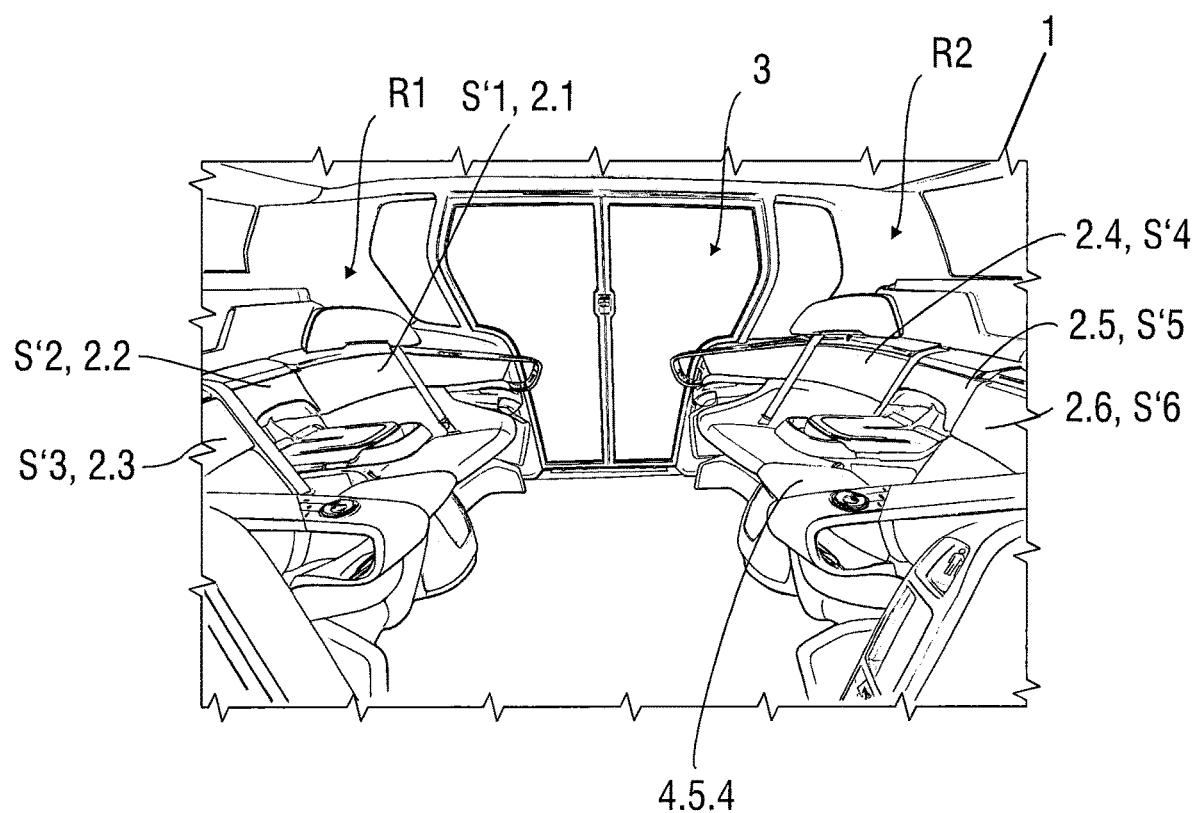
FIG. 2 shows a perspective view of a vehicle interior having at least two rows of a plurality of seat assemblies facing each other.

FIG. 2 shows a perspective view of a vehicle interior 3 having at least two rows R1, R2, e.g. a rear row and a front row, of a plurality of seat assemblies 2.1 to 2.6 of seats S1 to S6. Each of the rows R1 and R2 comprises three seat assemblies 2.1 to 2.3 and 2.4 to 2.6 wherein the seat assemblies 2.1 to 2.3 and 2.4 to 2.6 of the rows R1 and R2 are facing each other.

The seats S1, S3, S4 and S6 are configured as outboard seats of the rows R1, R2. The seats S2 and S5 are configured as center seats of the rows R1, R2.

Figure 3:
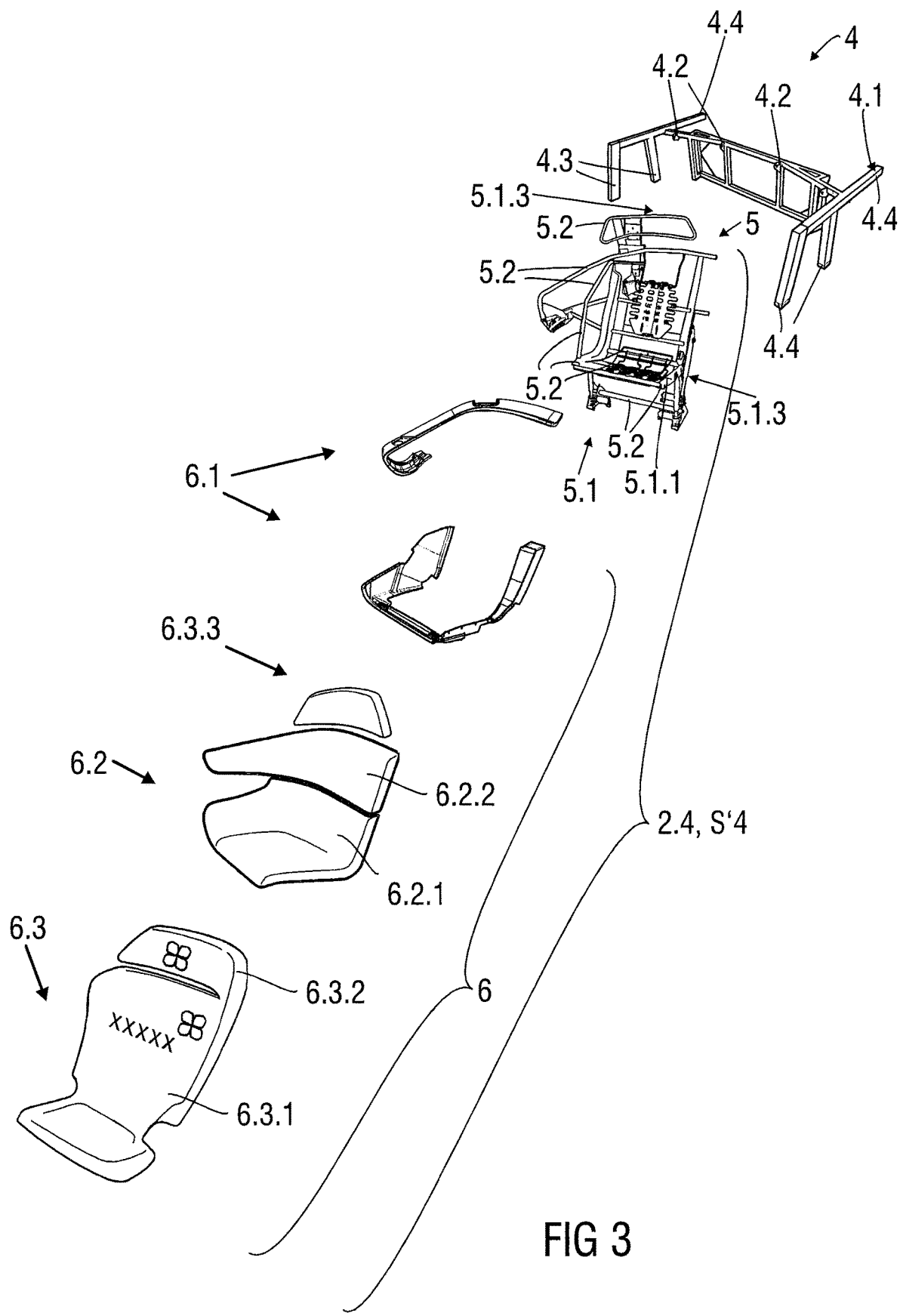
FIG. 3 shows an exploded view of a seat assembly comprising at least a seat mounting structure, seat structure and a seat trim structure comprising a mounting element, a detachable support member and a detachable trim element.

FIG. 3 shows an exploded view of an exemplary embodiment of one of the seat assemblies 2.*n*, e.g. seat assembly 2.4. The seat assembly 2.4 comprises at least a seat mounting structure 4, a seat structure 5 and a seat trim structure 6 comprising a mounting element 6.1, a detachable support member 6.2 and a detachable trim element 6.3.

The seat mounting structure 4 is fixed to a frame, a floor or a chassis of the vehicle 1. The seat mounting structure 4 is configured e.g. as a seat rib cage 4.1, to attach and retain the seat structure 5 of the respective seat S4 of the seat assembly 2.4 on it. In particular, the seat mounting structure 4 is provided for mounting seats S, e.g. seats S1 to S3 or S4 to S6, within the vehicle 1. The seat mounting structure 4 is configured to attach to the vehicle frame.

In the shown embodiment, the seat rib cage 4.1 can be configured to retain at least one seat structure 5 of at least one respective seat S4. Alternatively, the seat rib cage 4.1 can be configured to retain more than one seat structures 5 of two or three respective seats S1 to S3 or S4 to S6 of one of the rows R1 or R2 or with a special mounting bracket or other auxiliary units 5.6, e.g. a bracket for a wheel chair to hold the chair in place.

The seat mounting structure 4 comprises seat mounting points 4.2 to detachably mount the seat structure 5 to the seat mounting structure 4 e.g. by screws or rivets.

To provide two rows R1, R2 of seats S1 to S6 within the vehicle 1 two seat mounting structures 4 are mounted to the vehicle interior 3 and affixed to the vehicle frame structure.

The seat rib cage 4.1 may be formed by a plurality of rib cage elements or mounting elements 4.3, e.g. ribs, tubes, pipes, rods, bars, webs and/or bearing beams, which are connected with each other, e.g. welded, bolted or screwed. The mounting elements 4.3 may be further configured as at least one of rails, tracks, plates, panels or sheets.

The seat rib cage 4.1 further comprises a plurality of vehicle structure mounting points 4.4 to detachably attach it to the floor or chassis within the vehicle interior 3 of the vehicle 1.

The seat structure 5 is configured for example as a main frame 5.1, e.g. a seat supporting frame made of at least one of metal or composite or hybrid material. The main frame 5.1 may be formed by a plurality of frame elements 5.2, e.g. ribs, tubes, pipes and/or bearing beams, brackets, attachments, which are connected with each other, e.g. welded, bolted or screwed. The plurality of structures, e.g. struts, ribs, tubes, pipes, attachments of support elements, brackets, can be formed of composite or hybrid materials e.g. molded as a whole part or unit or can be configured as separated elements or components bonded together to form a complete main frame 5.1.

In particular, at least one of the frame elements 5.2 is configured variably extendable to allow at least one of variable length, variable width or variable height of the main frame 5.1. Thus, the seat structure 5 is simply variable adjustable for smallest to largest occupants.

The seat structure 5, in particular a frame structure, may comprise struts, beams, tubes, pipes, rods, bars, planes, pads. The seat structure 5 may be supported by axially extendable struts, e.g. vertical bearing tubes 5.3 and/or cross bearing tubes, and/or lower, middle or upper frame part 5.1.1 to 5.1.3. The middle frame part 5.1.2 may further comprise a pivot mechanism to movably arrange and hold the seat S with respect to the vehicle floor. Such additional bearing tubes 5.3 or lower, middle or upper frame parts 5.1.1 to 5.1.3 allow highly adjustable seating positions of the seat S in regards to tilt and height movement relative to the vehicle floor.

In particular, the seat structure 5 may be provided without an integrated recliner mechanism. In an exemplary embodiment, a recliner mechanism may to be configured to attach to the seat structure 5. In particular, the recliner mechanism may be configured as a separate recliner attachment which can be linked to the seat structure 5.

The seat trim structure 6 is configured to detachably attach it to the main frame 5.1.

In an exemplary embodiment, the seat trim structure 6 comprises the mounting element 6.1 to which one or more support members 6.2 may be detachably arrange wherein one or more trim elements 6.3 may be arranged onto one or more of the support members 6.2 and detachably attached to the mounting element 6.1.

The seat S4 may comprise three separate support members 6.2.1 to 6.2.3, e.g. a lower support member 6.2.1, e.g. a seat cushion panel or seat cushion pad, a middle support member 6.2.2, e.g. a seat back cushion pad or seat back cushion panel, an upper support member 6.2.3, e.g. a head restraint cushion pad. In particular the support members 6.2.1 to 6.2.3 are configured as foam pads, e.g. cushion panel or cushion pads. The support members 6.2.1 to 6.2.3 may be produced by a 3D printing process.

The trim element 6.3 may be configured as a one-piece element for the whole seat S4. The trim element 6.3 may be formed by a material of one or more of a vinyl, fabric, and/or leather. Further, the trim element 6.3 may be configured as a trim cover having a curved profile.

The seat S4 may comprise three separate trim elements 6.3.1 to 6.3.3, e.g. a lower trim element 6.3.1, e.g. a seat cushion panel or seat cushion pad, a middle trim element 6.3.2, e.g. a seat back cushion pad or seat back cushion panel, an upper trim element 6.3.3, e.g. a head restraint cushion pad. In particular the trim elements 6.3.1 to 6.3.3 are configured as trim covers.

The trim element 6.3 can be replaced easily by detaching from the mounting element 6.1 to individualize or customize the respective seat S4, e.g. by different prints or watermarks onto a front surface 6.2.6 of different trim elements 6.3. The mounting element 6.1 is for instance configured as a mounting substrate element produced by a 3D printing process or injection moulding process.

In particular, each of the support members 6.2.1 to 6.2.3 comprise a rear surface 6.2.7 and a front surface 6.2.6 wherein the rear surface 6.2.7 of each support members 6.2.1 to 6.2.3 is detachably arranged to a front surface 6.2.6 of the mounting element 6.1 and a rear surface 6.2.7 of the trim element 6.3 is detachably arranged to the front surfaces 6.2.6 of the support members 6.2.1 to 6.2.3 and attached to the mounting element 6.1.

Further, the support members 6.2.1 to 6.2.3 are made of foam, e.g. polyurethane foam, viscose elastic foam.

Figure 4:
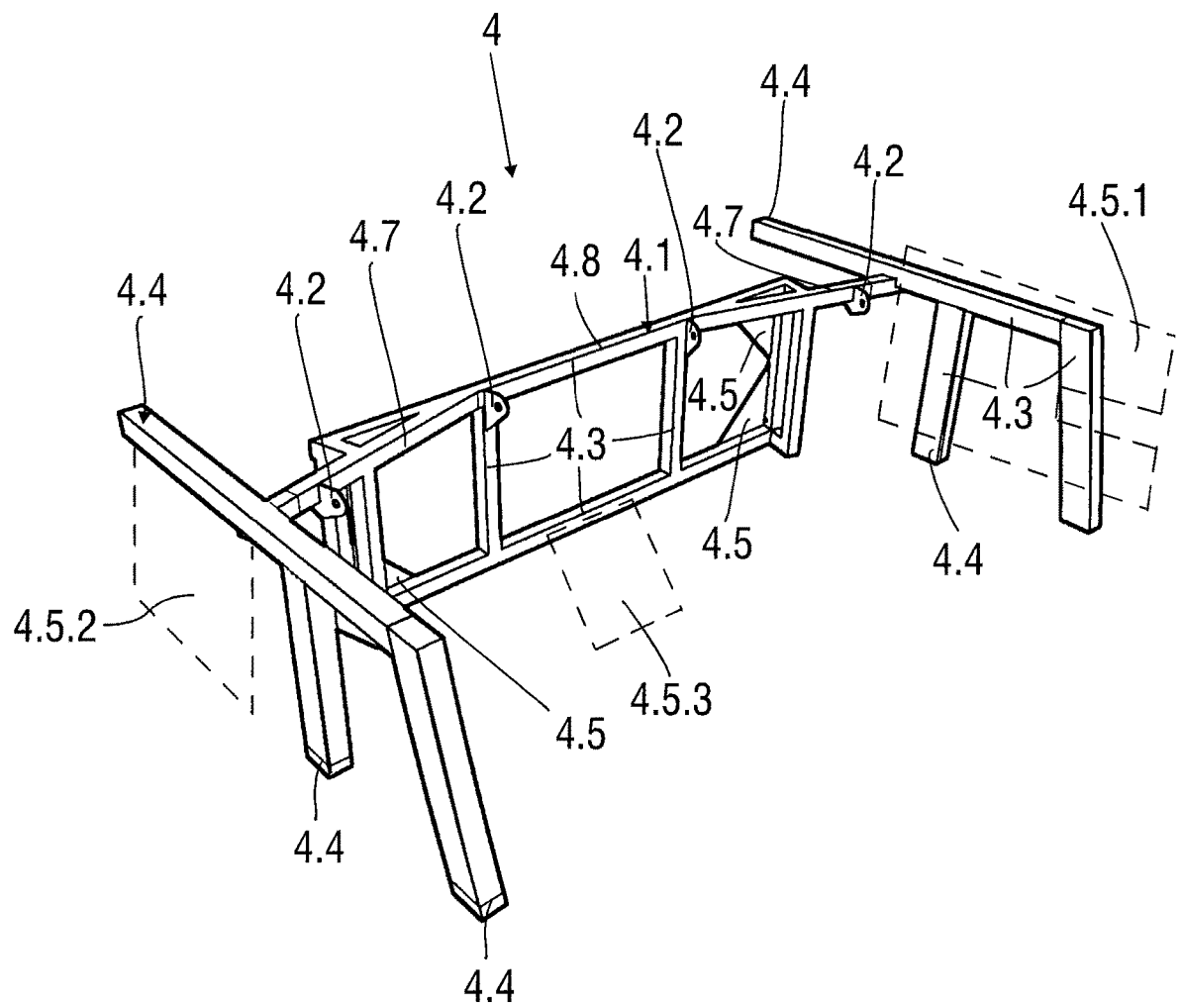
FIG. 4 shows a perspective view of a seat mounting structure for a vehicle.

FIG. 4 shows a perspective view of an exemplary embodiment of the seat mounting structure 4 for different interior types 3.1 to 3.4 of a vehicle 1 shown in FIGS. 7, 7A to 7D.

The seat mounting structure 4, in particular the seat rib cage 4.1 is configured as a universal mounting rib cage for multiple seating and storage applications and configurations.

Figure 5:
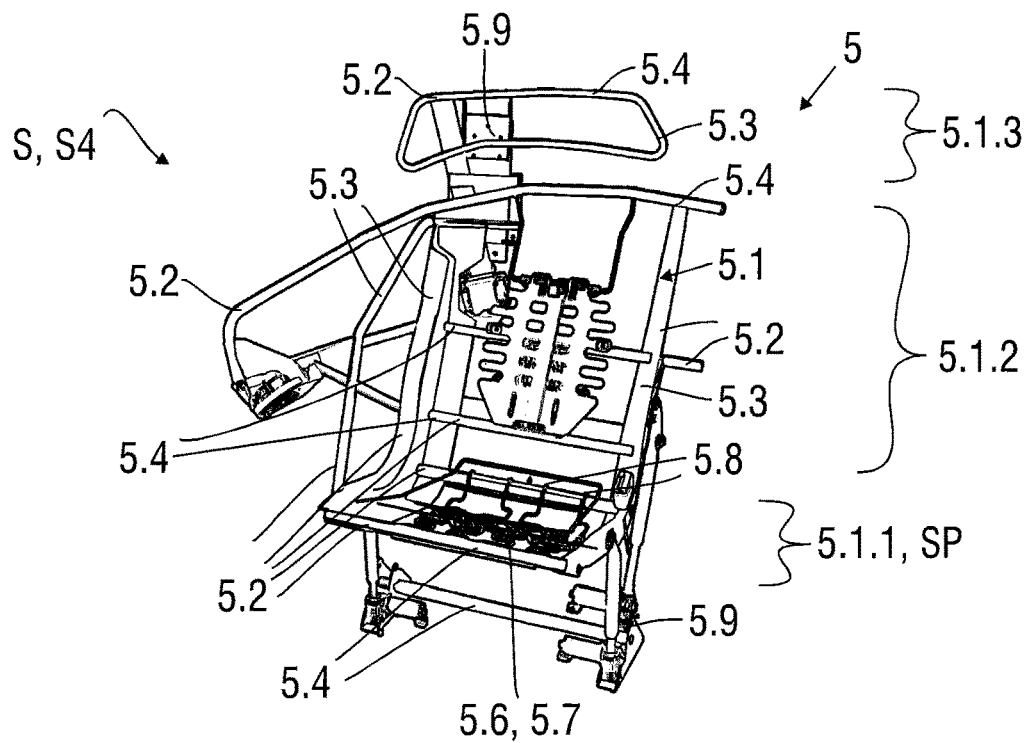
FIG. 5 shows a perspective view of a seat structure which is mountable to the seat mounting structure according to FIG. 4.

The seat mounting structure 4 comprises the seat rib cage 4.1 which is configured cantilevered and which comprises integrated seat mounting points 4.2 to mount at least one seat structure 5 as shown in FIG. 5 to the seat rib cage 4.1 and vehicle structure mounting points 4.4 for mounting the seat rib cage 4.1 to the floor or chassis of the vehicle 1 to provide one of the different interior types 3.1 to 3.4.

Figure 6:
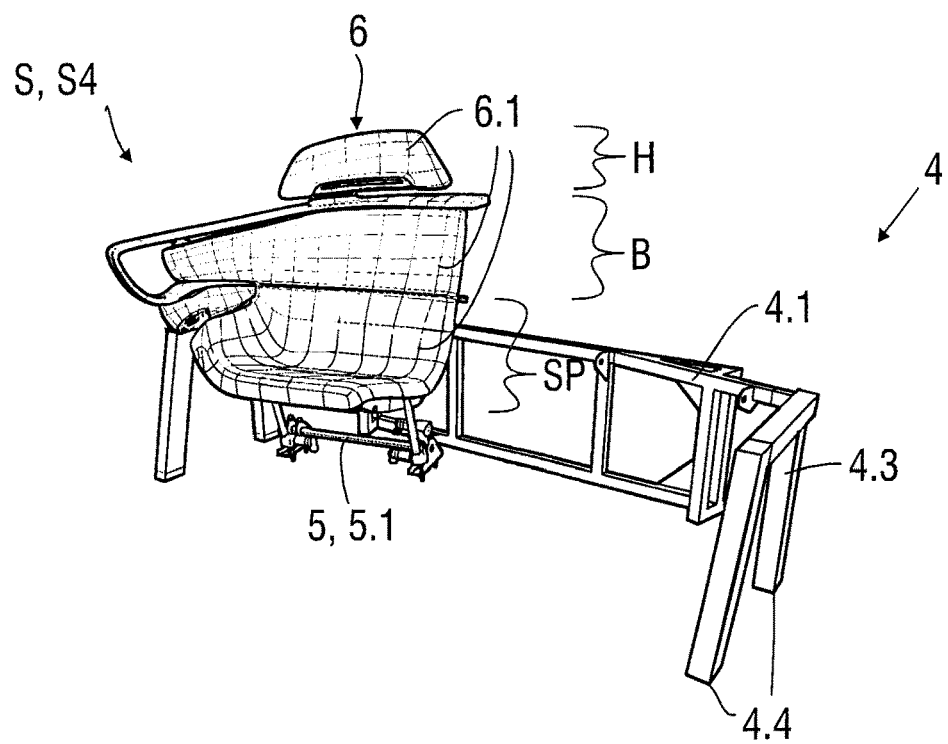
FIG. 6 shows a perspective view of a seat mounting structure having one mounted seat, in particular one seat structure mounted to a common seat mounting structure.

Further, the seat rib cage 4.1 comprises optional mounting locations 4.5 to mount seat adjusting devices 4.6 as shown in FIGS. 5, 6, such as seat pivot and movement devices.

One of the mounting locations 4.5 is configured as a loading track assembly 4.5.1 to assemble and position a seat assembly 2.4, in particular the respective seat structure 5 of e.g. seat S4, into an assembling position to assemble the seat S4 in a correct position onto the seat rib cage 4.1. The seat rib cage 4.1 can further comprise optional carrier 4.5.2, e.g. mounting plates, ribs, panels to mount an armrest, optional center carrier 4.5.3 e.g. to mount a center seat S5.

The seat rib cage 4.1 is configured as a universal mounting structure for two or three seat assemblies 2.4 to 2.6 to provide different interior types 3.1 to 3.4.

The seat rib cage 4.1 comprises rib cage elements 4.3 which are fixed with each other by at least one of welding, screwing, riveting, snap fittings, snap-lock connections. In an exemplary embodiment, the seat rib cage 4.1 is made of at least one of a composite material, hybrid composite material, metal hybrid material, plastic material, synthetic fiber material or a metal material.

The seat rib cage 4.1 is shaped as a bulkhead style seat mounting structure 4 which frees up space for batteries located in a vehicle floor. In particular, the seat rib cage 4.1 is arranged on the vehicle floor and extends in a transverse direction of the vehicle floor.

For example, the seat rib cage 4.1 is formed in a U-shaped manner, wherein the seat or seats S1 to S6 is/are arranged between the parallel running distanced legs of the U-shaped seat rib cage 4.1.

The seat rib cage 4.1 comprises a frame structure which packages the seat mounting points 4.2 off the vehicle floor and to a bulkhead style beam that runs cross-car. For instance, a connection portion of the two legs forms said bulkhead style beam. The legs of the U-shaped seat rib cage 4.1 form integral side impact beams for passenger safety.

In another embodiment, a not shown front loading latch system is provided within the vehicle 1, in particular within the vehicle interior 3 or passenger compartment, for allowing service providers to quickly install and remove set of seats S1 to S6 from one of the vehicle interiors 3 of the vehicle 1 with a sliding seat fixture to provide different interior types 3.1 to 3.4.

The seat rib cage 4.1 is further configured to variably arrange different modules, frame structures or auxiliary units of at least one of seats S, armrest structures, belt restraint devices, headrest structures or auxiliary units, or seat adjusting devices.

In particular, the seat rib cage 4.1 is configured to arrange and hold three seat structures 5 of seats S1 to S3 or S4 to S6 next to each other in such a manner that at least one outboard seat S1, S3, S4 or S6 is inwardly angled with respect to the respective center seat S2 or S5. For example, the outboard seat S1, S3, S4 or S6 is inwardly angled with respect to the center seat S2 or S5 in an angle range between 0 degrees to 20 degrees, in particular at an angle of 15 degrees.

To provide this inwardly angled positioning of outboard seats S1, S3, S4 or S6 within the seat rib cage 4.1 the mounting points 4.2 for the outboard seats S1, S3, S4 or S6 are arranged on ribs 4.7 which are angled with respect to a cross base frame 4.8.

FIGS. 5, 6 show different embodiments of a seat structure 5. The seat structure 5 comprises a main frame 5.1, e.g. a seat supporting frame, made of at least one of metal or composite material. The main frame 5.1 may be formed by a plurality of frame elements 5.2, e.g. ribs, tubes, pipes and/or bearing beams, which are connected with each other, e.g. welded, bolted, attached or screwed.

The seat structure 5 is mountable to the seat mounting structure 4. The seat mounting structure 4 can be assembled priority to the vehicle frame or chassis. The seat mounting structure 4 may alternatively integrated into the vehicle structure, e.g. chassis or frame. The seat mounting structure 4 forms an integrated part of the vehicle structure. Alternatively the seat mounting structure 4 may be a separately attached unit. In particular, the seat mounting structure 4 may be an assembly unit which is e.g. welded to the vehicle structure.

The seat structure 5 of outer seats S, e.g. of seat S1, S3, S4 or S6, may be assembled to the seat mounting structure 4 and/or the vehicle frame structure in a given angle range e.g. by assembling the seat structure 5 at the mounting points 4.2 fixed at the angled ribs 4.7. The seat structure 5 may be assembled in an angle range e.g. between 0 degree to 20 degrees, in particular between 10 degrees to 15 degrees, preferably at 15 degrees.

Such limited angled positioning of the seat structure 5 with respect to the seat mounting structure 4 allows a comfortable position of the occupant to the neighboring, e.g. center sitting occupant of seat S2 or S5. This angled positioning, e.g. 15-degrees-angled positioning of the seat structure 5 with respect to the seat mounting structure 4 keeps the occupants line of sight on the center of the vehicle interior 3 across from them and not directly across into the eyes of occupants directly sitting across from them.

The seat structure 5 comprises the main frame 5.1 configured to mount different parts of a seat S, e.g. a seat pan SP, a backrest B and a headrest H. For instance, the main frame 5.1 comprises a lower frame part 5.1.1 for mounting a seat pan SP on it, a middle frame part 5.1.2 for mounting a backrest B and an upper frame part 5.1.3 for mounting a headrest H of the seat S. The main frame 5.1 could be further simplified by combining the backrest B and the seat pan SP into a mono-frame or one-piece frame. This one-piece frame as shown in the FIGS. 5, 6 is designed and mounted into the vehicle 1 angled inwards 15 degrees from fore and aft to give the occupant more flexibility and overall comfort within their personal space. This angled positioning, e.g. 15-degree angled positioning, for each outboard seat S1, S3, S4 or S6 also creates an overall environment that is more conductive to a social space or coffee house on wheels.

The seat structure 5 has a plurality of tubes, in particular vertical bearing tubes 5.3 and/or cross holding tubes 5.4. In particular, two cross holding tubes 5.4 are arranged in the area of the lower frame part 5.1.1. The cross holding tubes 5.4 are being spaced from one another by an opening 5.5 in which auxiliary units 5.6, e.g. a spring pad 5.7, is arranged and hold onto the cross holding tubes 5.4 by hooks 5.8.

The cross holding tubes 5.4 may also be used to arrange and hold at least one of detachable support members 6.1 of a seat trim structure 6. The support members 6.1 are foam parts which comprise a curved shape for a comfort seating surface of the seat S. The seat trim structure 6 may be configured as a detachable one-piece support member 6.1. In the FIG. 6, three separate detachable support members 6.1 are shown.

The seat structure 5 can further comprise optional auxiliary carrier 5.9, e.g. mounting plates, ribs, panels to mount a belt device, a drive unit, a motor, a loudspeaker or other devices, e.g. electronic devices.

On the lateral side of the seat mounting structure 4 along the lateral side of the seat S4 the loading track assembly 4.5.1 is assembled to guide the seat assembly 2.4, in particular the respective seat structure 5 of seat S4, into an assembling position to assemble the seat S4 in a correct position onto the seat rib cage 4.1 (shown in FIG. 4). The seat rib cage 4.1 can further comprise optional carriers 4.5.2, e.g. mounting plates, ribs, panels to mount an armrest, storage bin 4.5.4 (shown in a pull-out position, shown in FIG. 2), and/or optional center carriers 4.5.3 to mount the center seat S5.

The seat rib cage 4.1 is configured as a universal mounting structure for two or three seat assemblies 2.4 to 2.6 to provide different interior types 3.1 to 3.4.

The seat mounting structure 4 is configured to mount three seats S1 to S3 or S4 to S6 within the vehicle 1 to create one of the rows R1, R2, e.g. a rear row, center row and/or a front row. For example, the vehicle 1 is an autonomous driving vehicle configured to autonomously pick up and transport occupants, wherein the passenger compartment and vehicle interior 3, for instance, can be designed in a more comfortable and luxury way for the occupants, e.g. in different interior types 3.1 to 3.4 as shown in FIG. 7.

FIG. 7A shows the interior type 3.1, for instance a passenger compartment for a multi-occupant comfort seat arrangement 2 with two rows R1, R2 each of them having two seats S1, S2 and S3, S4. Each row R1 or R2 comprises one seat mounting structure 4 to detachably arrange and assemble the respective seats S1, S2 and S3, S4 within the vehicle interior 3. The seats S1, S2 and S3, S4 face each other. For instance, the FIG. 7A shows a front row R1 and a rear row R2 with usage of two the seat mounting structures 4, e.g. seat rib cage 4.1, for multi-occupant comfort. Each seat mounting structure 4 is further configured to hold storage units 8, e.g. vehicle batteries.

FIG. 7B shows the interior type 3.2, for instance a passenger compartment for a premium experience seat arrangement 2 with two convertible seats S1 to S2. The seats S1 and S2 are convertible from a seating position into a bed position. The seats S1, S2 are rotatably adjustable in a seating position. Each seat S1, S2 has its own unique mount bracket (=seat structure 5) but also ties into the universal seat mounting structure 4, e.g. universal seat rib cage 4.1.

FIG. 7C shows the interior type 3.3, for instance a passenger compartment for a multi-occupant basic economy seat arrangement 2 with three rows R1 to R3 each of them having three seats S1 to S3, S4 to S6 and S7 to S9. Each row R1 to R3 comprises one seat mounting structure 4 to detachably arrange and assemble the respective seats S1 to S3, S4 to S6 and S7 to S9 within the vehicle interior 3. The seats S1 to S9 face in the same direction.

FIG. 7D shows the interior type 3.4, for instance a cargo containment with a storage compartment 9 which is comparatively enlarged without any seat mounting structure 4. If full cargo space is not required, or for temporary cargo mode seat mounting structure 4 can remain in the vehicle 1 with no seats S attached. Mounting locations on seat mounting structure 4 can dock cargo containing devices. This interior type 3.4 allows reduction of the overall mass of the vehicle 1 when passengers are not on board due to removing of structural elements, e.g. all seat structures 5 from the seat mounting structure 4 and respective elements that protect and keep the passengers safe, Thus, the interior type 3.4 as a cargo mode provides an efficient cargo carrier. In a further embodiment, the seat rib cage 4.1 may be configured to retain at least one of a mounting bracket 4.5.2 or auxiliary unit to hold a separate chair, e.g. a wheel chair in place.

Figure 8:
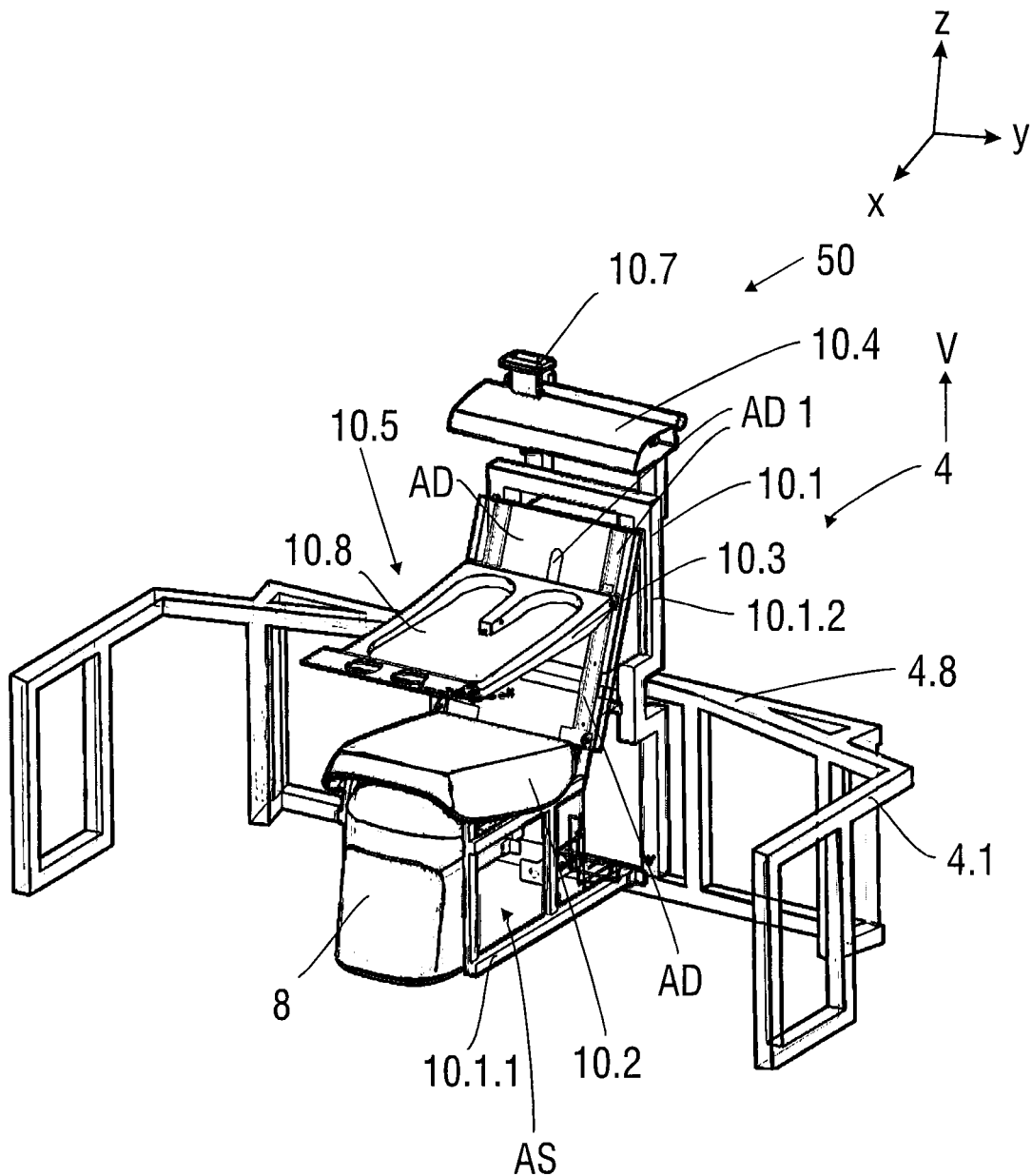
FIG. 8 shows a perspective view of a seat mounting structure having one mounted seat, in particular one center seat structure mounted to a common seat mounting structure.

FIG. 8 shows a perspective view of a center seating module 10 mounted to a center of a common seat mounting structure 4 and arranged in an armrest and tray table position.

Figure 9:
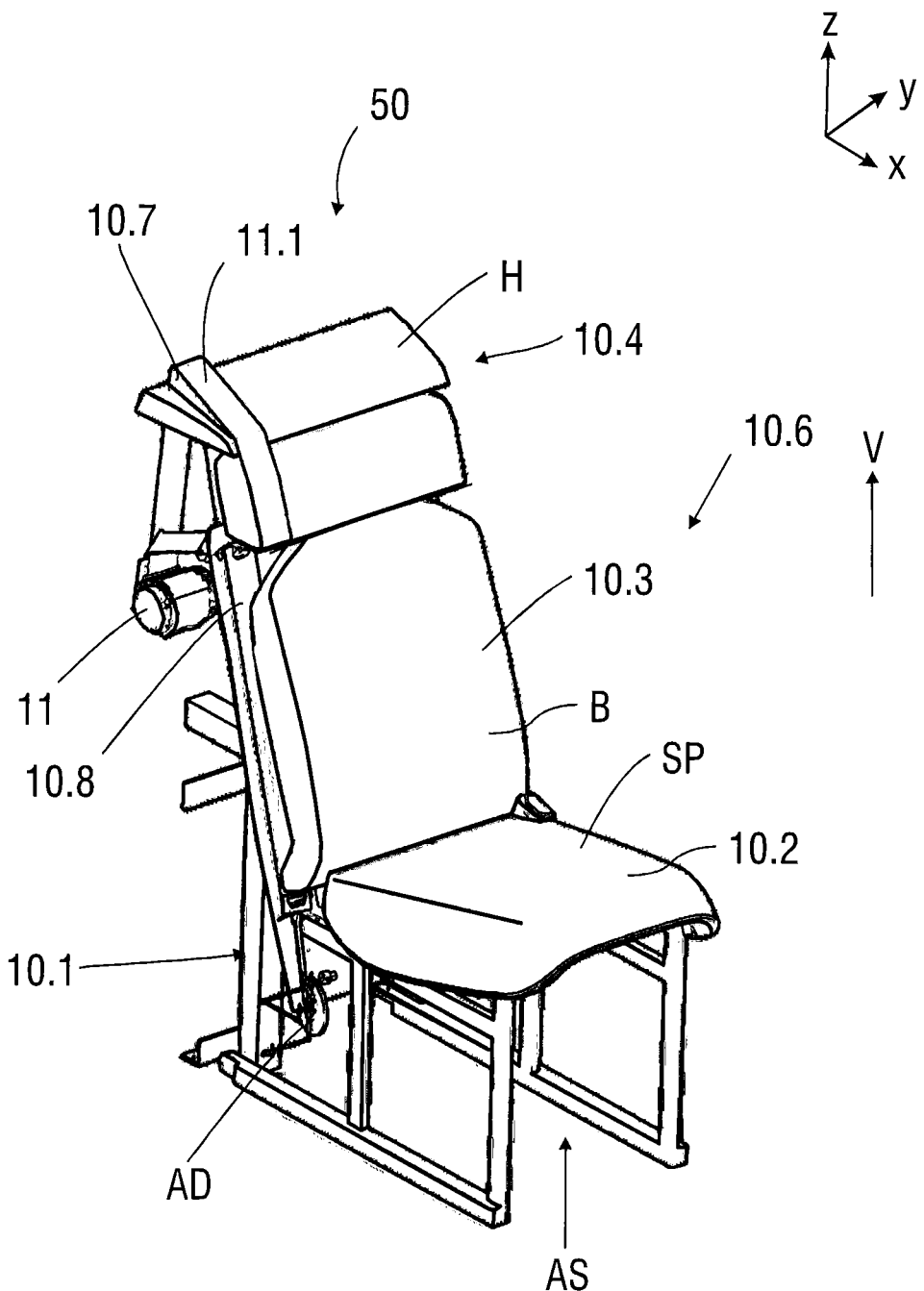
FIG. 9 shows a perspective view of a center seat module with seating modules arranged in a seating position.

FIG. 9 shows a perspective view of the center seating module 10 mounted to the center of the common seat mounting structure 4 and arranged in a seating position.

The center seating module 10 comprises at least a frame structure 10.1 and a plurality of seating modules 10.2 to 10.4 forming in a seating position a seating surface for an occupant or in an armrest and tray table position an armrest and/or tray table for an occupant.

The frame structure 10.1 is configured as a center mounting bracket to which the seating modules 10.2 to 10.4 are movably affixed to provide different functions, e.g. at least one of a combined armrest and tray table function 10.5 by folding the backrest B in a folded position (shown in FIG. 8) or a seating function 10.6 with an upright backrest B (shown in FIG. 9) and to which an auxiliary bracket 10.7 is affixed a belt restrain device 11 having a belt 11.1 (shown in FIG. 9) at the frame structure 10.1.

The frame structure 10.1 comprises a stationary lower frame structure 10.1.1 and a stationary upper frame structure 10.1.2 which is coupled to the lower frame structure 10.1.1. The lower frame structure 10.1.1 comprises a reversed U-shaped form for carrying a seat pan SP whilst providing storage space AS underneath the seat pan SP. In particular, the storage space AS is provided between two spaced apart and parallel running legs of the U-shaped lower frame structure 10.1.1.

The seat pan SP is attached to the connection portion of the two legs of the U-shaped lower frame structure 10.1.1. Further, the upper frame structure 10.1.2 comprises an adjustment device AD and a movable backrest support 10.8, wherein the adjustment device AD is configured to adjust the backrest support 10.8 into an armrest and/or table position. In particular, the FIG. 9 shows the backrest B and the backrest support 10.8 in a normal backrest position and FIG. 8 shows the backrest B and the backrest support 10.8 in an armrest and/or table use position P2.

For example, a rear surface of the backrest support 10.8 forms an armrest and/or table surface. Additionally, the rear surface of the backrest support 10.8 can comprise pull out cup holders 10.9. The lower frame structure 10.1.1 and the upper frame structure 10.1.2 can comprise a so-called ABTS structure. The upper frame structure 10.1.2 is attached to a bulkhead 4.8, fore or aft bulkhead, of the seat mounting structure 4 and/or to the vehicle frame structure or the vehicle floor.

The storage space AS can be used for storing a beverage and/or snack bar if requested, for bags or other occupant belongings or a storage unit 8. Moreover, an integral underseat storage bin with a slide-out feature for greater access can be arranged within the storage space AS.

As seen in FIGS. 8 and 9, the adjustment device AD is configured to lock the backrest support 10.8 in a desired vertical position as well as in a desired tilted armrest and/or table position for improved comfort feeling.

Figure 10:
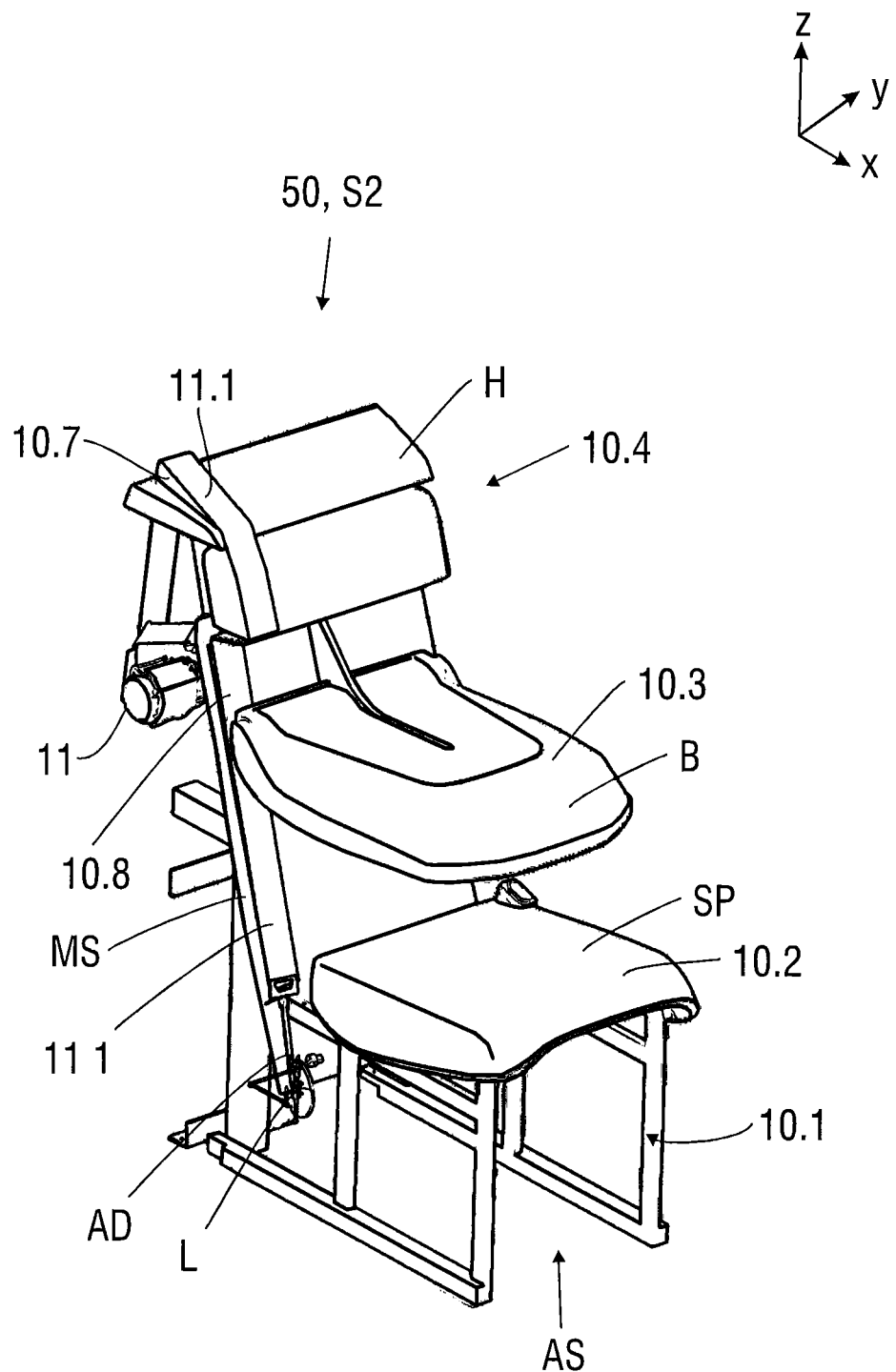
FIG. 10 shows a perspective view of a center seat module with seating modules arranged in an armrest/table tray position.

FIG. 10 shows a perspective view of the preassembled center seating module 10 with the seating modules 10.2 to 10.4 preassembled to the frame structure 10 of the center seat S2 or S5 in the tilted armrest and/or table position.

Figure 11A:
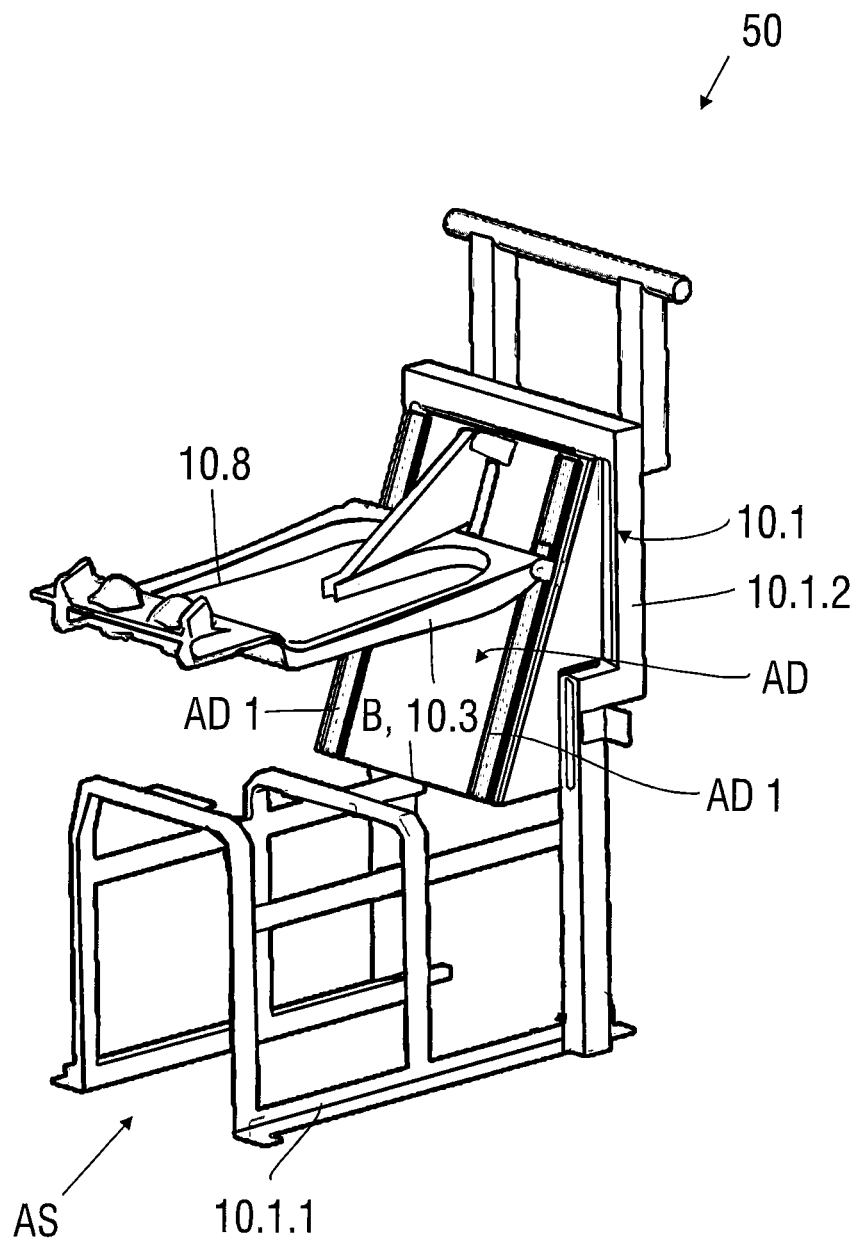
FIG. 11A shows a perspective view of a center seat module with a seating module in a tilted armrest or table position.

According to the sequence of the FIGS. 11A to 11D, the middle seating module 10.3 forming the backrest B is movably coupled to the frame structure 10.1 by the adjustment device AD from an upright seating position to an armrest and/or table position. The adjustment device AD comprises slides AD1 along which the backrest support 10.8 is movable in a vertical direction V. The backrest support 10.8 can be pulled at an upper ending (FIG. 11B) whereas the backrest support 10.8 can slide up and be folded (FIG. 11C) over till the backrest support 10.8 reaches a desired armrest and/or table position (FIG. 11D).

Figure 12A:
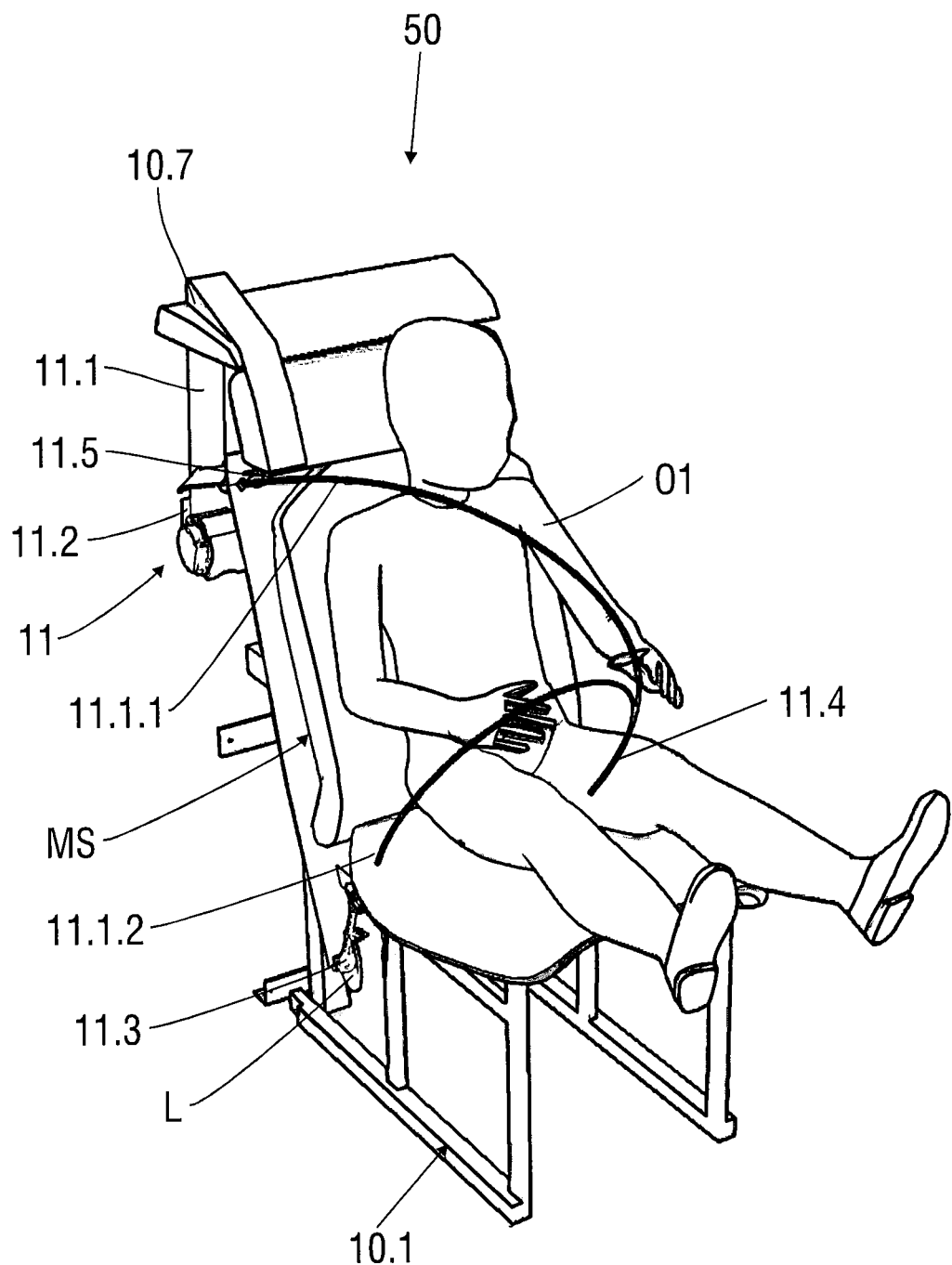
FIG. 12A shows a perspective view of center seat with a small occupant seated on the seat having a belt restraint device arranged in a lower fixing position.
Figure 12B:
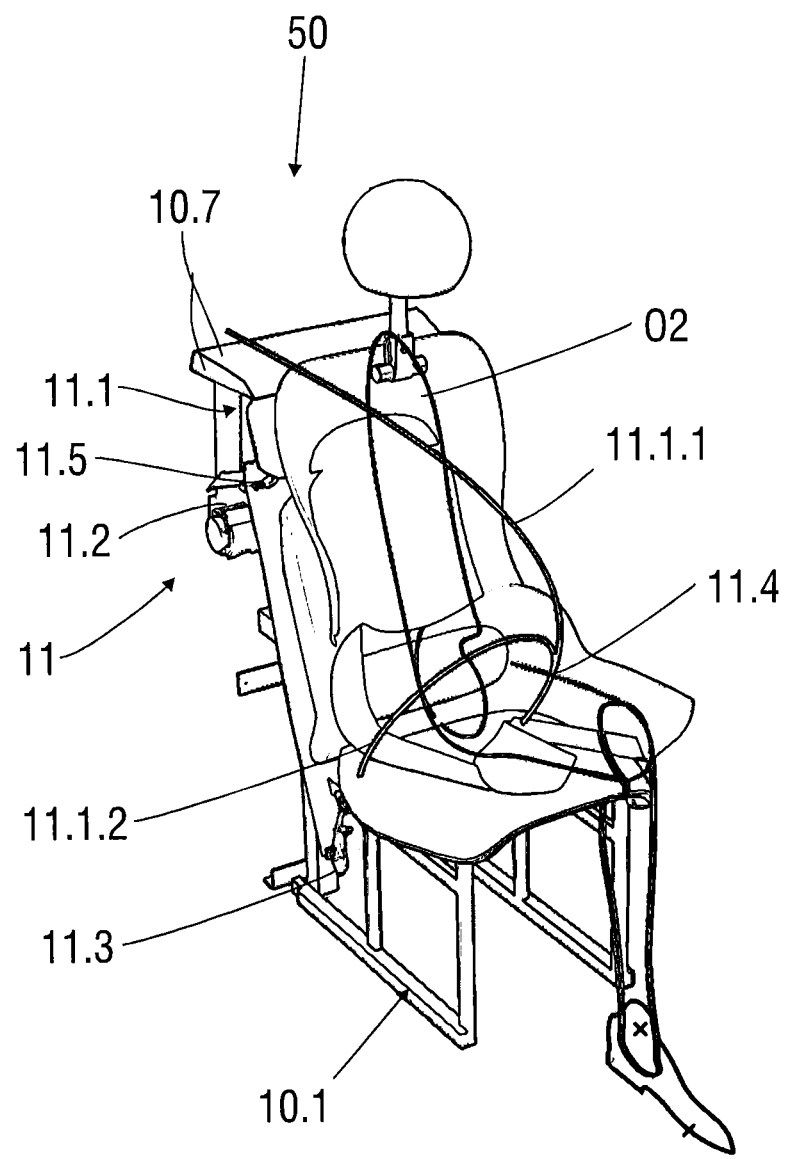
FIG. 12B shows a perspective view of center seat with a tall occupant seated on the seat having a belt restraint device arranged in an upper fixing position.

FIGS. 12A and 12B show perspective views of occupants O1, O2 seated on the center seating module 50 having the belt restraint device 11.

The belt restraint device 11 comprises a first restraint element 11.2 holding a shoulder belt 11.1.1, a second restraint element 11.3 holding a lap belt 11.1.2, wherein the shoulder belt 11.1.1 and the lap belt 11.1.2 are brought together within a third restraint element 11.4.

Further, the belt restraint device 11 comprises additionally to the auxiliary bracket 10.7 a further bracket, e.g. a clip element 11.5 into which the shoulder belt 11.1.1 is engageable for securing smaller occupants O1.

The second restraint element 11.3 and the clip element 11.5 are configured to be brought into different securing states dependently from each other to secure either a smaller occupant O1 (shown in FIG. 12A) or a greater occupant O2 (shown in FIG. 12B).

In particular, the second restraint element 11.3 and the clip element 11.5 are connected to each other in such manner that actuating one of the second restraint element 11.3 or the clip element 11.5 affects the other one.

In a normal usage, the shoulder belt 11.1.1 can be clipped into the clip element 11.5 which extends forward when required for smaller occupants O1.

The second restraint element 11.3, such as a lap belt router, is tied into a main structure MS, such as a frame structure, of the seat 50 by a latch L (shown in FIGS. 10 and 12A).

When the latch L is actuated the clip element 11.5 slides forward so a user can fit the shoulder belt 11.1.1 into the clip element 11.5. When the shoulder belt 11.1.1 is pulled out of the clip element 11.5, the second restraint element 11.3 swivels around an edge of the seat 50 or auxiliary bracket 10.7 to bring the shoulder belt 11.1.1 forward. The shoulder belt 11.1.1 can now be used for a greater occupant O2. The belt restraint device 11 is configured as an efficient ABTS (all belts to seat) system to properly position the shoulder and lap belts 11.1.1, 11.1.2 for both adults and smaller occupants O1, O2. The said belt restraint device 11 is a safe solution for children to be restrained properly in the seat 50 without need of a separate child booster seat. In particular, the clip element 11.5 is stowed behind a backrest support 10.8 which is foldable such that the clip element 11.5 is exposed to the user, wherein the user can properly grab the shoulder belt 11.1.1. For instance, the backrest support 10.8 can be used as an armrest and/or a table surface.

LIST OF REFERENCES 1 vehicle
2 seat arrangement
2.1 to 2.6, 2.n seat assembly
3 vehicle interior
3.1 to 3.4 interior type
4 seat mounting structure
4.1 seat rib cage
4.2 seat mounting point
4.3 mounting element
4.4 vehicle structure mounting point
4.5 mounting location
4.5.1 loading rack assembly
4.5.2 carrier
4.5.3 center carrier
4.5.4 storage bin
4.6 seat adjusting device
4.7 rib
4.8 bulkhead
5 seat structure
5.1 main frame
5.1.1 lower frame part
5.1.2 middle frame part
5.1.3 upper frame part
5.2 frame element
5.3 vertical bearing tube
5.4 cross holding tube
5.5 opening
5.6 auxiliary unit
5.7 spring pad
5.8 hook
5.9 auxiliary carrier
6 seat trim structure
6.1 mounting element
6.1.1 retaining element
6.1.2 retaining channel
6.1.3 trim channel
6.2 support member
6.2.1 lower support member
6.2.2 middle support member
6.2.3 upper support member
6.2.4 holding member
6.2.5 holding slot
6.2.6 front surface
6.2.7 rear surface
6.2.8 positioning pin
6.3 trim element
6.3.1 lower trim element
6.3.2 middle trim element
6.3.3 upper trim element
7 occupant support component
7.1 support element
7.2 L-shaped upper portion
7.2.1 leg of L-shaped upper portion
7.3 U-shaped side portion
7.3.1 leg of U-shaped side portion
8 storage unit
9 storage compartment
10 center seating module
10.1 frame structure
10.1.1 lower frame structure
10.1.2 upper frame structure
10.2 seating module
10.3 seating module
10.4 seating module
10.5 armrest and tray table function
10.6 seating function
10.7 auxiliary bracket
10.8 backrest support
10.9 cup holders 11 belt restraint device
11.1 belt
11.1.1 shoulder belt
11.1.2 lap belt
11.2 first restraint element
11.3 second restraint element
11.4 third restraint element
11.5 clip element
A aft
B backrest
D down
F fore
H headrest
P horizontal pivot axis
R1 to R3 row
S, S1 to S9 seat
SP seat pan
U up
V vertical direction
AD adjustment device
AD1 slide
AS storage space
L latch
MS main structure
O1, O2 occupant

The invention claimed is:

1. A seat mounting structure for at least one seat in a vehicle having a vehicle structure, the seat mounting structure comprising:
at least a seat structure to which at least one seat is affixed,
a seat rib cage configured as a universal solitary mounting bracket to which the seat structure is mounted,
wherein the seat rib cage comprises:
a plurality of rib cage elements connected with each other to form the seat rib cage,
a plurality of seat mounting points for detachable mounting the seat structure to said seat rib cage, and
a plurality of vehicle structure mounting points for mounting the seat rib cage to said vehicle structure,
wherein the plurality of seat mounting points are provided in an upper area of the seat rib cage distanced from a vehicle bottom when mounted,
wherein the seat mounting points are arranged on a front surface side of a cross base frame and hold a rear facing side of the seat structure to the cross base frame in front of the cross base frame.

2. The seat mounting structure according to claim 1, wherein the rib cage elements are configured as one of struts, beams, tubes, pipes, rods, bars, webs, rails, tracks, plates, panels or sheets.

3. The seat mounting structure according to claim 1, wherein the seat rib cage is configured to variably arrange at least one of a number of seat structures of at least one of seats, armrest structures, belt modules, headrest structures or auxiliary units, or seat adjusting devices.

4. The seat mounting structure according to claim 1, wherein the seat rib cage is configured to arrange and hold three seat structures of seats next to each other in such a manner that at least one outboard seat is inwardly angled with respect to a center seat.

5. The seat mounting structure according to claim 4, wherein the outboard seat is inwardly angled with respect to a center seat in an angle range between 0 degrees to 20 degrees.

6. The seat mounting structure according to claim 4, wherein the rib cage elements are fixed with each other by at least one of welding, screwing, riveting, snap fittings, snap-lock connections.

7. The seat mounting structure according to claim 1, wherein the seat rib cage is configured to retain at least one of a mounting bracket or auxiliary unit to hold a separate chair in place.

8. The seat mounting structure according to claim 1, wherein the seat rib cage is configured to retain at least one of a mounting bracket or auxiliary unit to hold at least one of a load or cargo in place.

9. The seat mounting structure according to claim 1, wherein the seat rib cage comprises a plurality of mounting locations for arranging at least one of seat adjusting devices, seat assembling units, mounting brackets or auxiliary units to said seat rib cage.

10. The seat mounting structure according to claim 6, wherein the seat rib cage is configured to hold the seat structure at the seat rib cage in a given angle range between 0 degrees to 20 degrees with respect to seat rib cage.

11. The seat mounting structure according to claim 1, wherein the seat rib cage is made of at least one of a composite material, hybrid composite material, metal hybrid material, plastic material, synthetic fiber material or a metal material.

12. The seat mounting structure according to claim 1, further comprising:
at least one seat structure comprising at least a main frame formed by a plurality of frame elements.

13. The seat mounting structure according to claim 1, wherein the seat structure is fastened to the seat rib cage by said seat mounting points in such a manner that the seat structure is relatively movable with respect to the seat rib cage by at least one seat adjusting device.

14. The seat mounting structure according to claim 9, wherein the at least one seat structure is configured to relatively moveable with respect to the seat rib cage in at least two degrees of freedom for performing at least a rotation, including a pivoting movement fore and aft, and a linear movement, including a vertical movement up and down.

15. A center seat structure for a vehicle, comprising:
a plurality of seating modules of a seat, and
a frame structure,
wherein the frame structure is configured as a center mounting bracket to which the seating modules can be movably affixed to provide different functions comprising an armrest, a tray table or a backrest and to which an auxiliary bracket is affixed to provide an additional belt fixing position,
a seat rib cage configured as a universal solitary mounting bracket to which the seat can be affixed,
wherein the seat rib cage, comprises:
a plurality of rib cage elements connected with each other to form the seat rib cage,
a plurality of seat mounting points for detachable mounting the seat to said seat rib cage, and
a plurality of vehicle structure mounting points for mounting the seat rib cage to said vehicle structure, wherein the plurality of seat mounting points are provided in an upper area of the seat rib cage distanced from a vehicle bottom when mounted.

16. The center seat structure according to claim 15, wherein a first seating module is configured as a lower seating module forming a seat pan and a second seating module is configured as a middle multi-function module which is movable with respect to at least one of the frame structure or the first seating module such that in a first position the second seating module forms a backrest and in a second position the second seating module forms at least one of an armrest or tray table.

17. The center seat structure according to claim 15, further comprises
a third seating module configured as an upper seating module which comprises a belt bracket to hold a belt mechanism in an upper belt fixing position.

18. The center seating structure according to claim 17, wherein
the auxiliary bracket is provided in an area between the upper seating module and
the middle multi-function module and configured to hold the belt mechanism in the additional belt fixing position which is lower than the upper belt fixing position.

19. The center seating structure according to claim 15, wherein the frame structure comprises at least one of
a stationary lower frame structure having a profile shape for carrying the seat pan and providing storage space underneath the seat pan, or
an upper frame structure comprising an adjustment device and a movable backrest support, wherein the adjustment device is configured to adjust the backrest support into at least in one of an armrest position or tray table position.

20. A seat mounting structure for at least one seat in a vehicle having a vehicle structure, the seat mounting structure comprising:
a seat rib cage configured as a mounting bracket to which the at least one seat can be affixed,
wherein the seat rib cage, comprises:
a plurality of rib cage elements comprising two side legs and a cross base frame extending between the two side legs, wherein the cross base frame has upper and lower rib cage elements connected by generally vertically extending rib cage elements, wherein the side legs have downwardly extending rib cage elements, wherein said rib cage elements connect with each other to form a general U-shape,
a plurality of seat mounting points on the cross base frame for detachable mounting the seat to said seat rib cage, and
a plurality of vehicle structure mounting points on each of the side legs for mounting the seat rib cage to said vehicle structure.

* * * * *